(12) United States Patent
Carnevali

(10) Patent No.: US 11,489,350 B2
(45) Date of Patent: Nov. 1, 2022

(54) CRADLE FOR MOBILE DEVICES WITH RESILIENT GUIDES AND METHODS OF MAKING AND USING

(71) Applicant: National Products, Inc., Seattle, WA (US)

(72) Inventor: Jeffrey D. Carnevali, Seattle, WA (US)

(73) Assignee: National Products, Inc., Seattle, WA (US)

( * ) Notice: Subject to any disclaimer, the term of this patent is extended or adjusted under 35 U.S.C. 154(b) by 0 days.

(21) Appl. No.: 16/725,774

(22) Filed: Dec. 23, 2019

(65) Prior Publication Data
US 2021/0194256 A1  Jun. 24, 2021

(51) Int. Cl.
*H02J 7/00* (2006.01)
*F16B 2/12* (2006.01)
*F16M 13/02* (2006.01)

(52) U.S. Cl.
CPC .............. *H02J 7/0044* (2013.01); *F16B 2/12* (2013.01); *F16M 13/022* (2013.01)

(58) Field of Classification Search
CPC ... H05K 5/0247; H05K 5/0086; G06F 1/1626
(Continued)

(56) References Cited

U.S. PATENT DOCUMENTS

| 809,977 A | 1/1906 | O'Brien |
| 1,786,459 A | 7/1926 | Simons |

(Continued)

FOREIGN PATENT DOCUMENTS

| CN | 1312603 | 9/2001 |
| CN | 101674096 | 3/2010 |

(Continued)

OTHER PUBLICATIONS

Otterbox Product directory, 20 pages of product description of Otter Box waterproof boxes retrieved from web site at: www.otterbox.com Dated Sep. 2, 2005. Otter Products, LLC, Bldg. 1 Old-Town Square, Suite 303, Fort Collins, CO 80524 Phone: 1-888-695-8820, 970-493-8446; Facsimile: 1-888-695-8827, 970-493-1755.

(Continued)

*Primary Examiner* — Christopher Garft
*Assistant Examiner* — Michael McDuffie
(74) *Attorney, Agent, or Firm* — Branch Partners PLLC; Bruce E. Black

(57) ABSTRACT

An adjustable cradle for mounting a mobile device that includes a base having a lower support, a back support, an engagement cavity defined by the back support, and a connector disposed in the lower support; and an arm adjustably extending from the base and having an upper support and a base engagement element extending partially and adjustably into the engagement cavity. The base and arm define an adjustable cavity to receive the mobile device with the upper support, lower support, and back support engaging the mobile device. The base further includes opposing resilient guides extending from the back support to adjust to a width of the mobile device, or a combination of the mobile device and a case, to engage the mobile device or case and to guide a connector of the mobile device or case into coupling with the connector of the base.

20 Claims, 3 Drawing Sheets

(58) Field of Classification Search
USPC ..... 248/231.41, 274.1, 309.1, 316.4, 229.12, 248/229.22, 671; 361/679.09, 679.55, 361/679.56; 379/454, 455; 455/575.1
See application file for complete search history.

(56) References Cited

U.S. PATENT DOCUMENTS

| | | | |
|---|---|---|---|
| 2,495,552 A | 1/1950 | Schmitz | |
| 2,549,917 A | 4/1951 | Millbrandt | |
| 2,565,939 A | 8/1951 | Wriston | |
| 2,612,947 A | 10/1952 | Jenks | |
| 2,717,093 A | 9/1955 | Mautner | |
| 2,803,368 A | 8/1957 | Koch | |
| 3,018,525 A | 1/1962 | Deisenroth | |
| 3,140,883 A | 7/1964 | Anthony | |
| 3,464,579 A | 9/1969 | Asenbauer | |
| 3,667,648 A | 6/1972 | Koziol | |
| 3,885,701 A | 5/1975 | Becklin | |
| 3,972,459 A | 8/1976 | Cooper | |
| 3,978,830 A | 9/1976 | Toth, Jr. | |
| 4,298,204 A | 11/1981 | Jinkins | |
| 4,564,880 A | 1/1986 | Christ et al. | |
| 4,607,772 A | 8/1986 | Hancock | |
| 4,828,558 A | 5/1989 | Kelman | |
| 4,842,174 A | 6/1989 | Sheppard et al. | |
| 4,848,319 A | 7/1989 | Appeldorn | |
| 5,002,184 A | 3/1991 | Lloyd | |
| 5,096,317 A | 3/1992 | Phillippe | |
| 5,135,189 A | 8/1992 | Ghazizadeh | |
| 5,246,133 A | 9/1993 | James | |
| 5,272,771 A | 12/1993 | Ansell et al. | |
| 5,295,602 A | 3/1994 | Swanson | |
| 5,353,934 A | 10/1994 | Yamauchi | |
| 5,457,745 A * | 10/1995 | Wang | B60R 11/0241 |
| | | | 379/426 |
| 5,535,274 A | 7/1996 | Braitberg et al. | |
| 5,584,054 A | 12/1996 | Tyneski et al. | |
| 5,586,002 A | 12/1996 | Notarianni | |
| 5,641,065 A | 6/1997 | Owens et al. | |
| 5,646,649 A | 7/1997 | Iwata et al. | |
| 5,791,506 A | 8/1998 | Sheffler et al. | |
| 5,813,096 A | 9/1998 | Soennichsen | |
| 5,822,427 A | 10/1998 | Braitberg et al. | |
| 5,842,670 A | 12/1998 | Nigoghosian | |
| 5,845,885 A | 12/1998 | Carnevali | |
| 5,860,550 A | 1/1999 | Miller et al. | |
| 5,895,018 A | 4/1999 | Rielo | |
| 5,953,795 A | 9/1999 | Bauer | |
| 5,969,057 A | 10/1999 | Schoeley et al. | |
| 5,990,874 A | 11/1999 | Tsumura et al. | |
| 5,992,807 A | 11/1999 | Tarulli | |
| 6,009,601 A | 1/2000 | Kaufman | |
| 6,010,005 A | 1/2000 | Reames et al. | |
| 6,032,910 A | 3/2000 | Richter | |
| 6,034,505 A | 3/2000 | Arthur et al. | |
| 6,035,800 A | 3/2000 | Clifford | |
| 6,043,626 A | 3/2000 | Snyder et al. | |
| 6,068,119 A | 5/2000 | Derr et al. | |
| 6,149,116 A | 11/2000 | Won | |
| 6,191,943 B1 * | 2/2001 | Tracy | G06F 1/1632 |
| | | | 361/679.46 |
| 6,229,893 B1 | 5/2001 | Chen | |
| 6,273,773 B1 | 8/2001 | Bourke | |
| 6,276,552 B1 | 8/2001 | Vervisch | |
| 6,295,198 B1 | 9/2001 | Loh et al. | |
| 6,341,218 B1 | 1/2002 | Poplawsky et al. | |
| 6,356,053 B1 | 3/2002 | Sandoz et al. | |
| 6,377,825 B1 | 4/2002 | Kennedy et al. | |
| 6,406,758 B1 | 6/2002 | Bottari et al. | |
| 6,407,860 B1 | 6/2002 | Funazaki et al. | |
| 6,572,176 B2 | 6/2003 | Davies et al. | |
| 6,585,212 B2 | 7/2003 | Carnevali | |
| 6,588,637 B2 | 7/2003 | Gates et al. | |
| 6,597,924 B1 | 7/2003 | Smith | |
| 6,614,423 B1 | 9/2003 | Wong et al. | |
| 6,646,864 B2 | 11/2003 | Richardson | |
| 6,648,376 B2 | 11/2003 | Christianson | |
| 6,687,516 B2 | 2/2004 | Chen | |
| 6,702,604 B1 | 3/2004 | Moscovitch | |
| 6,754,343 B2 | 6/2004 | Lundstrom et al. | |
| 6,762,585 B2 | 7/2004 | Liao | |
| 6,776,422 B1 | 8/2004 | Toy | |
| 6,785,566 B1 | 8/2004 | Irizarry | |
| 6,785,567 B2 | 8/2004 | Kato | |
| 6,816,713 B2 | 11/2004 | Chen | |
| 6,842,171 B2 | 1/2005 | Richter et al. | |
| 6,953,126 B2 | 10/2005 | Parker et al. | |
| 6,984,680 B2 | 1/2006 | Quinn | |
| 6,995,976 B2 | 2/2006 | Richardson | |
| 7,017,243 B2 | 3/2006 | Carnevali | |
| 7,031,148 B1 | 4/2006 | Lin | |
| 7,068,783 B2 | 6/2006 | Peiker | |
| 7,158,376 B2 | 1/2007 | Richardson et al. | |
| 7,180,735 B2 | 2/2007 | Thomas et al. | |
| 7,230,823 B2 | 6/2007 | Richardson et al. | |
| 7,248,901 B2 | 7/2007 | Peiker | |
| 7,257,429 B2 | 8/2007 | Kogan | |
| 7,283,849 B2 | 10/2007 | Peiker | |
| 7,311,526 B2 | 12/2007 | Rohrbach et al. | |
| 7,312,984 B2 | 12/2007 | Richardson et al. | |
| 7,351,066 B2 | 4/2008 | DiFonzo et al. | |
| 7,464,814 B2 | 12/2008 | Carnevali | |
| 7,480,138 B2 | 1/2009 | Kogan et al. | |
| 7,481,664 B1 | 1/2009 | Knoll et al. | |
| 7,517,222 B2 | 4/2009 | Rohrbach et al. | |
| 7,520,389 B2 | 4/2009 | Lalouette | |
| 7,551,458 B2 | 6/2009 | Carnevali | |
| 7,566,224 B2 | 7/2009 | Wu | |
| 7,594,576 B2 | 9/2009 | Chen et al. | |
| 7,609,512 B2 | 10/2009 | Richardson et al. | |
| 7,612,997 B1 | 11/2009 | Diebel et al. | |
| 7,641,477 B2 | 1/2010 | DiFonzo et al. | |
| 7,645,143 B2 | 1/2010 | Rohrbach et al. | |
| 7,663,879 B2 | 2/2010 | Richardson et al. | |
| 7,688,580 B2 | 3/2010 | Richardson et al. | |
| 7,812,567 B2 | 10/2010 | Shen | |
| 7,841,776 B2 | 11/2010 | DiFonzo et al. | |
| 7,850,032 B2 | 12/2010 | Carnevali et al. | |
| 7,855,529 B2 | 12/2010 | Liu | |
| 7,889,489 B2 * | 2/2011 | Richardson | G06F 1/1632 |
| | | | 361/679.32 |
| 7,901,216 B2 | 3/2011 | Rohrbach et al. | |
| 7,907,394 B2 | 3/2011 | Richardson et al. | |
| 7,970,440 B2 * | 6/2011 | Bury | B60R 11/0241 |
| | | | 455/569.2 |
| 8,061,516 B2 * | 11/2011 | Carnevali | H04M 1/04 |
| | | | 206/320 |
| 8,074,951 B2 | 12/2011 | Carnevali | |
| 8,087,939 B2 | 1/2012 | Rohrbach et al. | |
| 8,099,138 B2 | 1/2012 | Piekarz | |
| 8,172,580 B1 | 5/2012 | Chen et al. | |
| 8,177,560 B2 | 5/2012 | Rohrbach et al. | |
| 8,183,825 B2 | 5/2012 | Sa | |
| 8,224,408 B2 | 7/2012 | Tomasini et al. | |
| 8,390,255 B1 | 3/2013 | Fathollahi | |
| 8,405,974 B2 | 3/2013 | Sayavong | |
| 8,414,312 B2 | 4/2013 | Hung et al. | |
| 8,435,042 B2 | 5/2013 | Rohrbach et al. | |
| 8,453,835 B2 | 6/2013 | So | |
| 8,483,758 B2 | 7/2013 | Huang | |
| 8,497,753 B2 | 7/2013 | DiFonzo et al. | |
| 8,560,014 B1 | 10/2013 | Hu et al. | |
| 8,634,887 B2 | 1/2014 | Hu et al. | |
| 8,639,288 B1 | 1/2014 | Friedman | |
| 8,646,698 B2 | 2/2014 | Chen et al. | |
| 8,690,582 B2 | 4/2014 | Rohrbach et al. | |
| 8,729,854 B2 | 5/2014 | Tsai et al. | |
| 8,760,311 B2 | 6/2014 | Heaton | |
| 8,763,802 B2 | 7/2014 | Ellis-Brown | |
| 8,801,441 B2 | 8/2014 | Zhang et al. | |
| 8,825,123 B1 | 9/2014 | Gudino | |
| 8,833,716 B2 * | 9/2014 | Funk | F16M 13/022 |
| | | | 248/316.4 |
| 8,891,800 B1 | 11/2014 | Shaffer | |

(56) References Cited

U.S. PATENT DOCUMENTS

| | | | |
|---|---|---|---|
| 8,907,783 B2 | 12/2014 | Fish et al. | |
| 8,911,246 B2 | 12/2014 | Carnevali | |
| 8,929,065 B2 | 1/2015 | Williams | |
| 8,950,717 B2 | 2/2015 | Chuang | |
| 8,970,332 B2 | 3/2015 | DiFonzo et al. | |
| 9,026,187 B2 | 5/2015 | Huang | |
| 9,071,060 B2 | 6/2015 | Fathollahi | |
| 9,072,172 B2 | 6/2015 | Hsu | |
| 9,112,304 B2 | 8/2015 | Rohrbach et al. | |
| 9,123,935 B2 | 9/2015 | Huang | |
| 9,147,966 B2 | 9/2015 | An | |
| 9,172,781 B1 | 10/2015 | Goldstein | |
| 9,356,267 B1 | 5/2016 | To et al. | |
| 9,602,639 B2 * | 3/2017 | Carnevali | H04B 1/3888 |
| 9,647,474 B2 | 5/2017 | Fathollahi et al. | |
| 9,776,577 B2 * | 10/2017 | Carnevali | F16M 11/041 |
| 9,831,904 B1 * | 11/2017 | Carnevali | G06F 1/1632 |
| 9,924,005 B1 * | 3/2018 | McElderry | H04M 1/04 |
| 10,172,246 B2 * | 1/2019 | Apter | B60R 11/0258 |
| 10,330,251 B2 * | 6/2019 | Carnevali | F16M 13/00 |
| 10,401,905 B2 * | 9/2019 | Carnevali | G06F 1/1626 |
| 2002/0009194 A1 * | 1/2002 | Wong | H04M 1/04 |
| | | | 379/449 |
| 2002/0191782 A1 * | 12/2002 | Beger | H04M 1/04 |
| | | | 379/454 |
| 2003/0116631 A1 * | 6/2003 | Salvato | G06F 1/1632 |
| | | | 235/472.01 |
| 2004/0108348 A1 | 6/2004 | Barnes | |
| 2005/0189354 A1 | 9/2005 | Heather et al. | |
| 2006/0058073 A1 | 3/2006 | Kim | |
| 2006/0175766 A1 | 8/2006 | Carnevali | |
| 2008/0149796 A1 * | 6/2008 | Moscovitch | F16M 13/00 |
| | | | 248/309.1 |
| 2009/0160400 A1 | 6/2009 | Woud | |
| 2009/0314400 A1 | 12/2009 | Liu | |
| 2012/0018325 A1 | 1/2012 | Kim | |
| 2012/0043235 A1 | 2/2012 | Klement | |
| 2012/0118773 A1 | 5/2012 | Rayner | |
| 2012/0211382 A1 | 8/2012 | Rayner | |
| 2012/0250270 A1 | 10/2012 | Liu | |
| 2012/0261306 A1 | 10/2012 | Richardson et al. | |
| 2012/0298536 A1 | 11/2012 | Rauta et al. | |
| 2013/0092576 A1 | 4/2013 | Rayner | |
| 2013/0106353 A1 | 5/2013 | Foster | |
| 2013/0193006 A1 | 8/2013 | Bergreen et al. | |
| 2013/0220841 A1 | 8/2013 | Yang | |
| 2013/0258573 A1 | 10/2013 | Muday et al. | |
| 2013/0273752 A1 | 10/2013 | Rudisill et al. | |
| 2013/0273983 A1 | 10/2013 | Hsu | |
| 2013/0331156 A1 | 12/2013 | Lui | |
| 2013/0334071 A1 | 12/2013 | Carnevali | |
| 2014/0042285 A1 * | 2/2014 | Carnevali | F16M 13/00 |
| | | | 248/316.4 |
| 2014/0363988 A1 | 12/2014 | An | |
| 2015/0146401 A1 | 5/2015 | Su et al. | |
| 2015/0189780 A1 | 7/2015 | Su et al. | |
| 2016/0231779 A1 * | 8/2016 | Kaneko | E05B 73/0082 |
| 2017/0227987 A1 | 8/2017 | Carnevali et al. | |

FOREIGN PATENT DOCUMENTS

| | | |
|---|---|---|
| CN | 202268924 | 6/2012 |
| CN | 202565335 | 11/2012 |
| CN | 204334055 | 5/2015 |
| CN | 204334674 | 5/2015 |
| CN | 204408423 | 6/2015 |
| JP | 2004-349969 | 12/2004 |
| JP | 2014-75327 | 4/2014 |
| KR | 20-0265673 | 2/2002 |
| KR | 10-1078214 | 11/2011 |
| TW | 2003TW531119 | 5/2003 |
| TW | M422808 | 2/2012 |
| WO | 2012/052751 | 4/2012 |
| WO | 2013/081222 | 6/2013 |
| WO | 2014/054426 | 4/2014 |
| WO | 2015/022675 | 2/2015 |

OTHER PUBLICATIONS

Officeonthego.com, 3 pages of product description of Magnifico ©PLUS screen magnifier product information retrieved from web site at: www.officeonthego.com.

2 pages of product information for Armor 1600 and Armor 1601 waterproof, dustproof and airtight protective cases.

2 pages OTTEROX 4600 Tablet PC Case protective cases product information retrieved from web site at: www.otterbox.com.

Jason Poel Smith: "Howto Transplant RFID Chips", Sep. 3, 2013 (Sep. 3, 2013), XP55492991, Retrieved from the Internet: URL: http://www.instructables.com/id/How-to-Transplant-RFID-Chips/ [retrieved on Jul. 17, 2018].

Certified English Translation of Chinese Published Patent Disclosure No. CN 1312603A ("Huang") (Foreign reference previously cited).

* cited by examiner

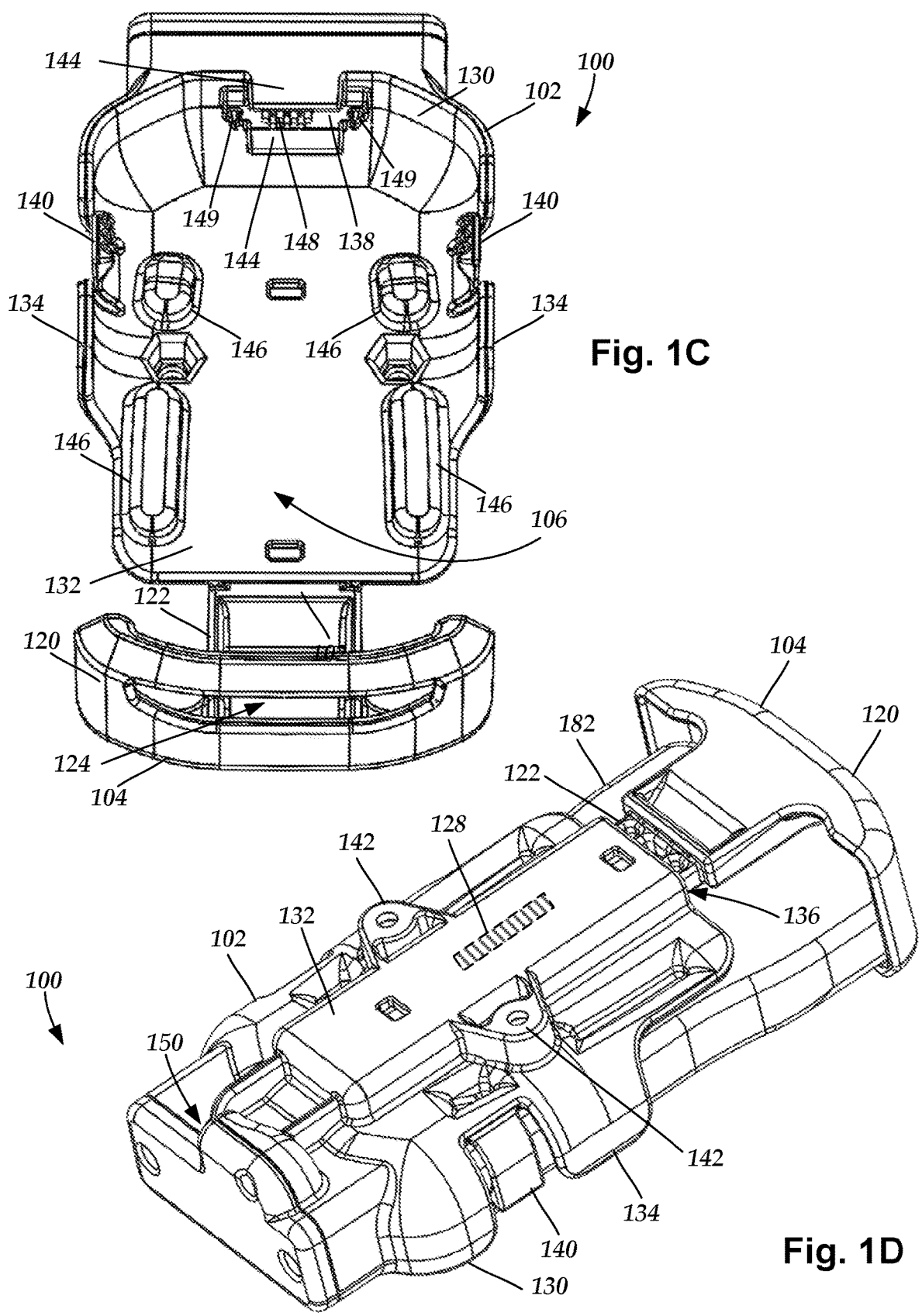

CRADLE FOR MOBILE DEVICES WITH RESILIENT GUIDES AND METHODS OF MAKING AND USING

FIELD

The present invention is directed to cradles for a mobile device. The present invention is also directed to cradles for attachment to a mobile device or case for a mobile device to facilitate charging of the device and, optionally, mounting the device to a surface or other object.

BACKGROUND

Mobile devices, such as smartphones, cell phones, tablets, and other portable devices, are now ubiquitous. There is often a need to facilitate charging the devices and a variety of docking stations or docking cradles are available to assist in charging mobile devices and, optionally, providing data exchange. In addition, there is often a need or desire to mount these mobile devices to a surface so that the user can interact with the mobile device without holding the device. For example, in a car or boat, the user may wish to mount the device nearby for use or visual observation without requiring that the user hold the device.

BRIEF SUMMARY

One embodiment is an adjustable cradle for mounting a mobile device that includes a base having a lower support, a back support coupled to the lower support, an engagement cavity defined by the back support, and a connector disposed in the lower support; and an arm adjustably extending from the base and having an upper support and a base engagement element coupled to the upper support and extending partially and adjustably into the engagement cavity. The base and arm define an adjustable cavity configured to receive the mobile device with the upper support, lower support, and back support engaging the mobile device. The base further includes opposing resilient guides extending from the back support and configured to adjust to a width of the mobile device, or a combination of the mobile device and a case disposed on the mobile device, to engage the mobile device or case and to guide a connector of the mobile device or case into coupling with the connector of the base.

In at least some embodiments, the base further includes right and left supports extending from the back support, wherein a lateral distance between the right and left supports is more than a lateral distance between the opposing resilient guides when there is no mobile device received by the cradle. In at least some embodiments, the opposing resilient guides are substantially more flexible than the right and left supports. In at least some embodiments, the opposing resilient guides are thinner laterally adjacent to the back support than the right and left supports. In at least some embodiments, the opposing resilient guides have a shorter longitudinal length than the right and left supports.

In at least some embodiments, the arm is slidably adjustable relative to the base. In at least some embodiments, the arm is biased toward the base to facilitate retention of the mobile device in the cradle. In at least some embodiments, the arm is spring-biased toward the base to facilitate retention of the mobile device in the cradle. In at least some embodiments, the adjustable cradle further includes at least one spring disposed in the engagement cavity to spring-bias the arm toward the base.

In at least some embodiments, the connector includes a plurality of contacts that are configured to move up and down relative to the lower support. In at least some embodiments, the contacts are pogo pins. In at least some embodiments, the connector of the cradle includes left and right pins to facilitate alignment of the connector of the mobile device or case with the connector of the cradle. In at least some embodiments, the connector of the cradle includes front and back guides to facilitate alignment of the connector of the mobile device or case with the connector of the cradle.

In at least some embodiments, the cradle is configured for electrically coupling to a power source and providing power from the power source to the mobile device through the connector of the cradle. In at least some embodiments, the cradle is configured for electrically coupling to a data source or data receiver and conveying data between the mobile device and the data source or data receiver through the connector of the cradle. In at least some embodiments, the upper support defines an aperture for access to a top of the mobile device.

In at least some embodiments, the base includes a mounting platform for attachment of a mount to the cradle.

Another embodiment is a system for mounting a mobile device that includes the preceding adjustable cradle of claim 17 and a mount coupleable to the mounting platform of the base.

A further embodiment is a system that includes any of the adjustable cradles described above and a mobile device. In at least some embodiments, the system further includes a case disposable on the mobile device.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 1C is a schematic perspective view of the cradle of FIG. 1A from a different angle and without the mobile device, according to the invention;

FIG. 1D is a schematic perspective view of the cradle of FIG. 1A with the mobile device from the back of the cradle, according to the invention.

DETAILED DESCRIPTION

Figure 1A:
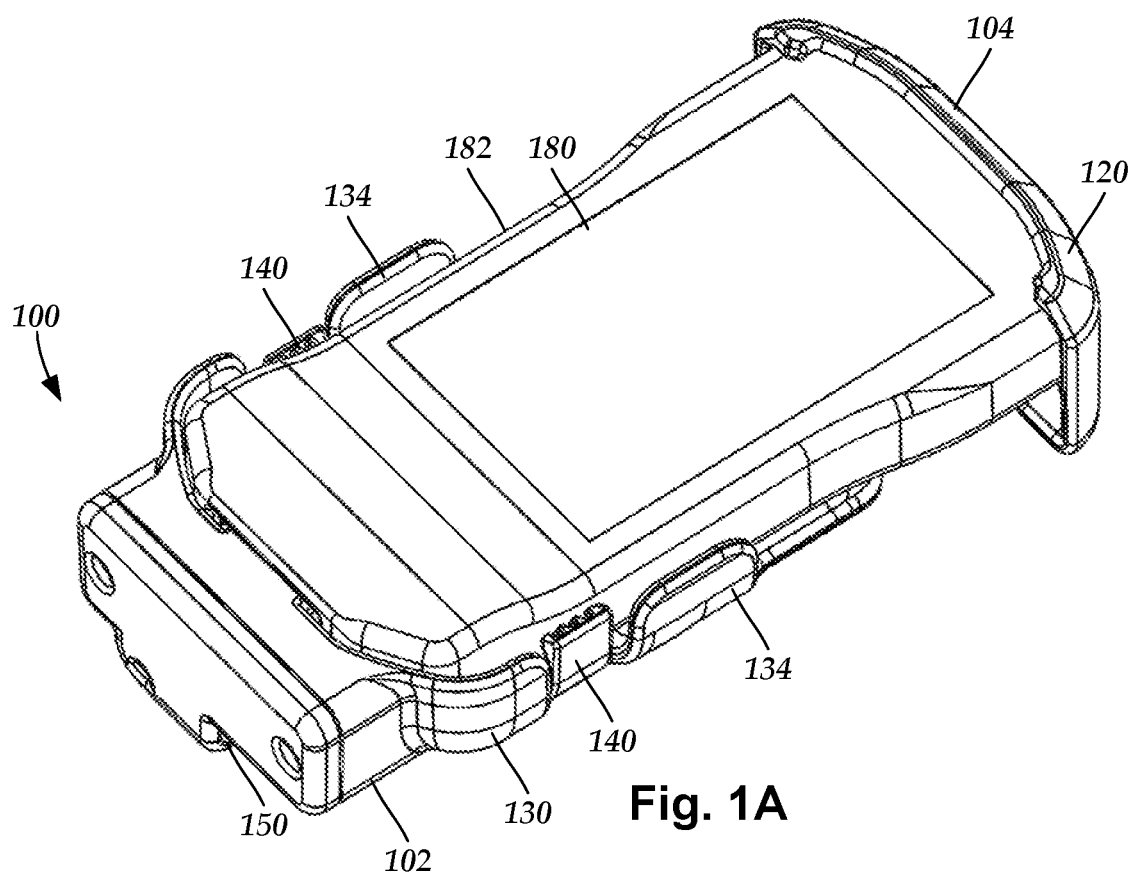
FIG. 1A is a schematic perspective view of one embodiment of a cradle with a mobile device disposed in the cradle, according to the invention.
Figure 1B:
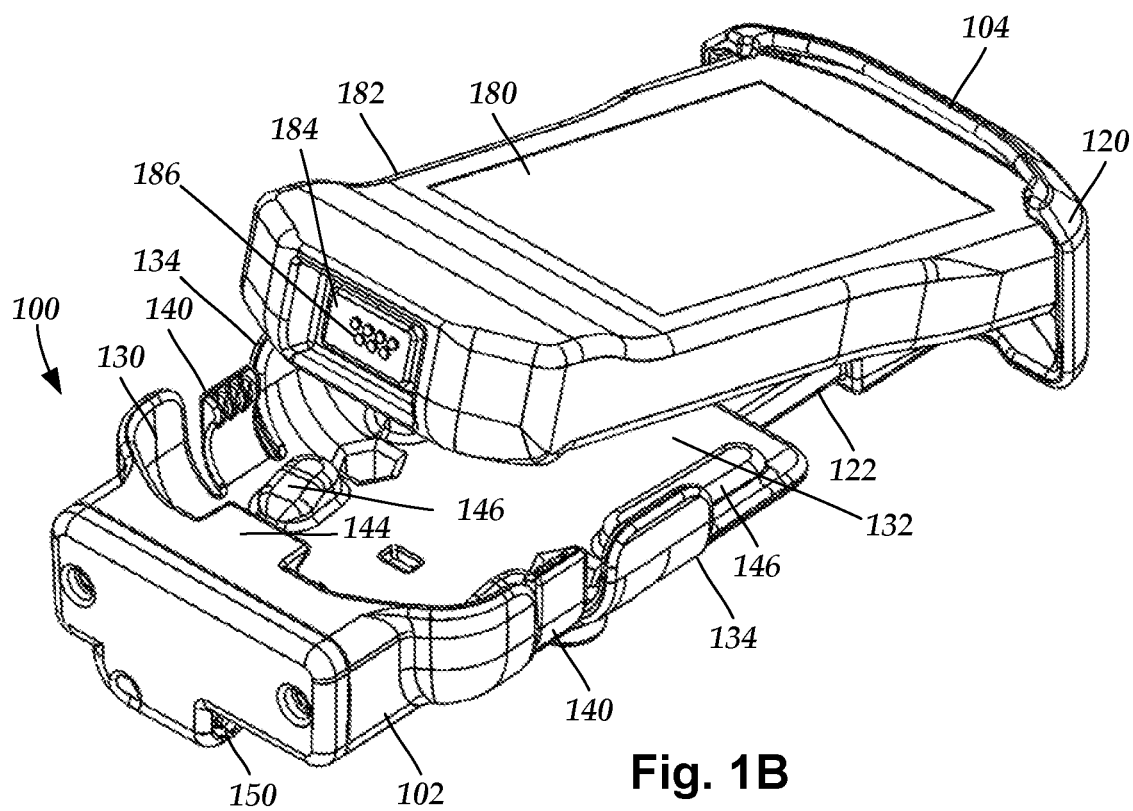
FIG. 1B is a schematic perspective view of the cradle of FIG. 1A with the mobile device being loaded or removed, according to the invention.

The present invention is directed to cradles for a mobile device. The present invention is also directed to cradles for attachment to a mobile device or case for a mobile device to facilitate charging of the device and, optionally, mounting the device to a surface or other object.

A cradle can be securely attached to a mobile device or a case of a mobile device and the cradle can include a mount that can be attached to a mounting device so that the mobile device can be mounted to a surface. For example, the cradle can facilitate mounting the mobile device in a motor vehicle or boat and is designed to retain the device despite vibration or shock to the mount. The cradle can be attached to the mobile device or case using any suitable coupling arrangement. The cradle can include a biased arm to more securely maintain the attachment between the cradle and the mobile device or case. The cradle may further include a mount that can be attached to a mounting device or the cradle can include the entire mounting device.

The cradle includes features that permit use of the cradle with mobile devices of different lengths or widths. These features can include the adjustable arm and opposing resilient guides.

FIGS. 1A-1D illustrate one embodiment of a cradle 100 configured to receive and hold a mobile device 180. The cradle includes a base 102 and an arm 104. Any suitable mobile device 180 can be attached to the cradle including, but not limited to, smartphones, cell phones, or other portable devices. The mobile device 180 may include a case 182 (e.g., a cover or skin) within which the mobile device 180 is disposed. Any suitable case 182, cover, or skin can be used including, but not limited to, the covers described in U.S. Pat. Nos. 9,195,279; 9,331,444; 9,529,387; 9,602,639; 9,632,535; 9,706,026; 9,954,330; 10,050,658; 10,054,984; 10,389,399; and 10,454,515, all of which are incorporated herein by reference in their entireties. The mobile device 180 or case 182 can have a connector 184 (FIG. 1B), with contacts 186, that is accessible to the cradle 100. For example, the mobile device 180 can have a USB, Lightning™, or other type of connector (not shown) or the case 182 can have a connector 184 such as the connectors/contactors described in the patents listed above.

In some embodiments, different cradles 100 may be used with different types of devices. For example, one cradle may be suitable for many or all smartphones, but a different cradle may be used for tablets or portable computers. The base 102 and arm 104 can be made of any suitable materials and may be made of the same or different materials. Suitable materials include, but are not limited to, metal, thermoplastics, other polymeric materials, or any combination thereof.

Mobile devices 180 can have a variety of different lengths and widths. Moreover, the inclusion of a case 182 on the mobile device 180 can alter the length or width of the combination relative to the mobile device itself and such alterations may depend on the specific case utilized.

The cradle 100 includes a number of features to accommodate mobile devices 180, with or without a case 182, of different lengths and widths. The arm 104 is movable (for example, slidable) relative to the base 102 to adjust the length of a cavity 106 (FIG. 1C) defined by the arm and the base of the cradle 100 for receiving the mobile device 180. In at least some embodiments, the arm 104 is biased (for example, spring-biased) toward the base 102 so that the arm 104 and base 102 reliably hold the mobile device 180 when received, but also allow a user to push the arm 104 away from the base 102 to facilitate loading the mobile device 180 into the cradle 100 (FIG. 1B) or removing the mobile device from the cradle and to adjust the size of the cavity 106. It will be understood that other mechanisms for moving the arm 104 relative to the base 102 and maintaining a position of the arm relative to the base can be used. Preferably, such a mechanism will fix the position of the arm relative to the base absent application of a force to push the arm away from the base. In at least some embodiments, the arm 104 may include an end stop that prevents or inhibits full disengagement of the arm 104 from the base 102.

In at least some embodiments, the arm 104 includes an upper support 120 to receive and hold a top portion of the mobile device 180. Extending from the upper support 120 is a base engagement member 122 with a portion of the base engagement member 122 inserted into an engagement cavity 136 (FIG. 1D) formed in the base. In at least some embodiments, one or more internal springs 128 (denoted by a dashed box in FIG. 1D) are also disposed in the engagement cavity 136 and are either compressed or expanded (depending on the type and arrangement of the spring(s) within the engagement cavity) when the arm 104 is pulled away from the base 102 to create a biasing force to draw the arm 104 back toward the base 102. In at least some embodiments, the upper support 120 may have an aperture 124 (FIG. 1C) at the top of the upper support to allow user access to buttons or other elements at the top of the mobile device 180.

The base 102 includes a lower support 130, a back support 132, optional right and left side supports 134, opposing resilient guides 140, the engagement cavity 136 (FIG. 1D), a connector 138 (FIG. 1C), and an optional mounting platform 142 (FIG. 1D). The back support 132 may include one or more protrusions 146 upon which the mobile device 180 can rest. The lower support 130, right and left side supports 134, and opposing resilient guides 140 extend from the back support 132. The right and left side supports 134 can provide protection to the mobile device 180. The lower support 130, back support 132, and right and left side supports 134 can be relatively rigid to provide protection for the mobile device 180 and resist flexing.

To accommodate different sized mobile devices 180, with or without a case 182, the opposing resilient guides 140 flex outwardly in response to the width of the mobile device 180 (and optional case 182) to center the mobile device for coupling the connector 184 of the mobile device with the connector 138 in the base 102. In at least some embodiments, the resilient guides 140 are substantially more flexible than the right and left side supports 134. In at least some embodiments, the lateral distance between the resilient guides 140, prior to loading a mobile device 180 into the cradle 100, is less than (for example, 1 to 10 mm or 1 to 5 mm less than) the lateral distance between the right and left side supports 134. When the width of the mobile device 180 or combination of mobile device 180 and case 182 is greater than the lateral distance between the resilient guides 140, the resilient guides flex outwardly to accommodate the wider mobile device (with or without a case). In at least some embodiments, when flexed the resilient guides 140 engage the mobile device 180 or case 182. In at least some embodiments, a lateral thickness of the resilient guides 140, in a region adjacent the back support 132, is thinner that a lateral thickness of the left and right supports 134 or the lower support 130, as illustrated in FIGS. 1A to 1D. This facilitates flexing of the resilient guides 140 as opposed to rigidity of the left and right supports 134 and lower support 130. In at least some embodiments, a longitudinal length of the resilient guides 140 is less than the longitudinal length of the left and right supports 134, as illustrated in FIGS. 1A to 1D.

In at least some embodiments, the base 102 further includes front and back guides 144 on opposite sides of the connector 138 to guide the mobile device 180 into coupling with the connector 138, to protect the connector, or to prevent the mobile device 180 from slipping out of the cradle 100, or any combination of these functions. The connector 138 includes contacts 148 for electrically coupling to corresponding contacts of the connector 184 of the mobile device 180 or case 182. In at least some embodiments, the contacts 148 of the connector 138 can move up or down and can be, for example, pogo pins. In at least some embodiments, the connector 138 of the base 102 of the cradle 100 can be any of the connectors/contactors described in the patents listed above. In some embodiments, the connector 138 can include one or more pins 149 (such as right and left pins, as illustrated in FIG. 1C) for guiding or insertion into the mobile device 180 or case 182.

The cradle 100 can be electrically coupled to a power source and provide power to the mobile device 180 from the power source through the connector 138 of the cradle. In at least some embodiments, the cradle 100 can be electrically coupled to a data source or a data receiver and convey data between the mobile device 180 and the data source or data receiver view the connector 138 of the cradle. The base 102 can include a jack 150 that is electrically coupled to the contacts 148 of the connector 138 and arranged for receiving a cable (not shown). In other embodiments, the cable (not shown) can be permanently attached to the base 102 with conductors in the cable attached to the contacts 148 of the connector 138. The cable can include a connector, such as a USB, Lightning™, or other connector on the opposite end for plugging into a power or data source.

Figure 2:
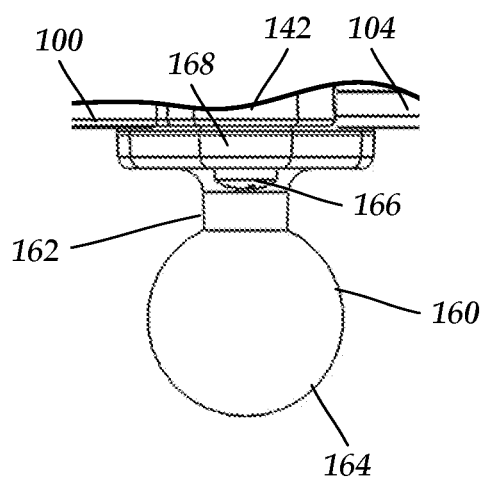
FIG. 2 is a schematic side view of a portion of the cradle of 1A attached to mount, according to the invention.

A mount 160 is optionally attached, or attachable, to the base 102 of the cradle 100, as illustrated in FIG. 2. The mount 160 includes a mounting base 162 and mounting ball 164 extending from the mounting base. In the illustrated embodiment, the mount 160 can include flanges 168 to attach to the mounting platform 142 (FIG. 1D) of the base 102. The mount 160 and base 102 can be attached together using one or more fasteners 166, such as a screw, bolt or other fastening device. The mounting ball 164 can be made of any suitable material including, but not limited to, metal or plastic materials. In some embodiments, the mounting ball 162 may be resilient to permit compressively coupling the mounting ball to a mounting device. It will be recognized that other mounting arrangement, including all or part of a mounting device, can be used in place of the mounting ball. Examples of such mounting devices, as well as mounts that can be used for mount 108 in conjunction with a mounting device, are described at U.S. Pat. Nos. 5,845,885; 6,561,476; 7,320,50; 7,997,554; 8,454,178; 8,505,861, RE42,060; RE42,581; and RE43,806, all of which are incorporated herein by reference, and are commercially as RAM® Mounts from National Products, Inc. It will be recognized that other mounts can also be used.

The above specification, examples and data provide a description of the manufacture and use of the invention. Since many embodiments of the invention can be made without departing from the spirit and scope of the invention, the invention also resides in the claims hereinafter appended.

What is claimed as new and desired to be protected by Letters Patent of the United States is:

1. An adjustable cradle for mounting a mobile device, the cradle comprising:
    a base comprising a lower support, a back support coupled to the lower support, an engagement cavity defined by the back support, and a connector disposed in the lower support; and
    an arm adjustably extending from the base and comprising an upper support and a base engagement element coupled to the upper support and extending partially and adjustably into the engagement cavity, wherein the base and arm define an adjustable cavity configured to receive the mobile device with the upper support, lower support, and back support engaging the mobile device;
    wherein the base further comprises opposing resilient guides extending from the back support and configured to flex outwardly in response to a width of the mobile device, or a combination of the mobile device and a case disposed on the mobile device, to engage the mobile device or case and to guide a connector of the mobile device or case into coupling with the connector of the base;
    wherein the base further comprises right and left supports extending from the back support, wherein the right and left supports are rigid and resist flexing.

2. The adjustable cradle of claim 1, wherein a lateral distance between the right and left supports is more than a lateral distance between the opposing resilient guides when there is no mobile device received by the cradle.

3. The adjustable cradle of claim 2, wherein the opposing resilient guides are thinner laterally adjacent to the back support than the right and left supports.

4. The adjustable cradle of claim 2, wherein the opposing resilient guides have a shorter longitudinal length than the right and left supports.

5. The adjustable cradle of claim 1, wherein the arm is slidably adjustable relative to the base.

6. The adjustable cradle of claim 1, wherein the arm is biased toward the base to facilitate retention of the mobile device in the cradle.

7. The adjustable cradle of claim 1, wherein the arm is spring-biased toward the base to facilitate retention of the mobile device in the cradle.

8. The adjustable cradle of claim 7, further comprising at least one spring disposed in the engagement cavity to spring-bias the arm toward the base.

9. The adjustable cradle of claim 1, wherein the connector comprises a plurality of contacts that are configured to move up and down relative to the lower support.

10. The adjustable cradle of claim 9, wherein the contacts are pogo pins.

11. The adjustable cradle of claim 1, wherein the connector of the cradle comprises left and right pins to facilitate alignment of the connector of the mobile device or case with the connector of the cradle.

12. The adjustable cradle of claim 1, wherein the connector of the cradle comprises front and back guides to facilitate alignment of the connector of the mobile device or case with the connector of the cradle.

13. The adjustable cradle of claim 1, wherein the cradle is configured for electrically coupling to a power source and providing power from the power source to the mobile device through the connector of the cradle.

14. The adjustable cradle of claim 1, wherein the cradle is configured for electrically coupling to a data source or data receiver and conveying data between the mobile device and the data source or data receiver through the connector of the cradle.

15. The adjustable cradle of claim 1, wherein the upper support defines an aperture for access to a top of the mobile device.

16. The adjustable cradle of claim 1, wherein the base comprises a mounting platform for attachment of a mount to the cradle.

17. A system for mounting a mobile device, the system comprising:
    the adjustable cradle of claim 16; and
    a mount coupleable to the mounting platform of the base.

18. A system, comprising:
    the adjustable cradle of claim 1; and
    the mobile device.

19. The system of claim 18, further comprising the case disposed on the mobile device.

20. The adjustable cradle of claim 1, wherein the right and left supports are permanently attached to the back support.

\* \* \* \* \*